United States Patent
Homma

(10) Patent No.: US 8,711,410 B2
(45) Date of Patent: Apr. 29, 2014

(54) IMAGE FORMING APPARATUS, INFORMATION PROCESSING METHOD, AND STORAGE MEDIUM FOR GENERATING SCREEN INFORMATION

(75) Inventor: Takayuki Homma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 282 days.

(21) Appl. No.: 13/197,396

(22) Filed: Aug. 3, 2011

(65) Prior Publication Data

US 2012/0033259 A1 Feb. 9, 2012

(30) Foreign Application Priority Data

Aug. 6, 2010 (JP) ................................ 2010-177921

(51) Int. Cl.
*G06F 3/12* (2006.01)
*G06K 15/00* (2006.01)

(52) U.S. Cl.
USPC ........................................ 358/1.15; 358/1.18

(58) Field of Classification Search
CPC ..... G06F 3/12; G06F 17/30; G06F 17/30899; G06F 9/45529; G06F 21/128; G06F 3/1243; G06F 17/30398; G06F 2206/151; G06K 9/00449; G06K 19/025; H04N 1/00127; H04N 1/00464; H04N 1/00503; H04N 21/8173

USPC ............... 358/1.1, 1.9, 1.13, 1.14, 1.16, 1.18, 358/402, 1.15; 709/201, 203, 213, 217; 715/201, 239, 716, 780

See application file for complete search history.

(56) References Cited

U.S. PATENT DOCUMENTS

| 7,689,707 | B2 | 3/2010 | Chobert |
| 8,379,258 | B2 * | 2/2013 | Uchida ........................ 358/1.15 |
| 8,413,038 | B2 * | 4/2013 | Lim et al. ...................... 715/201 |
| 2003/0088793 | A1 | 5/2003 | Parry |
| 2003/0225894 | A1 | 12/2003 | Ito |
| 2005/0108353 | A1 | 5/2005 | Yamamoto |
| 2011/0242608 | A1 * | 10/2011 | Uchida et al. ................ 358/1.16 |

FOREIGN PATENT DOCUMENTS

| CN | 101282272 A | 10/2008 |
| CN | 101465932 A | 6/2009 |
| JP | 2007-128370 A | 5/2007 |

* cited by examiner

*Primary Examiner* — Gabriel Garcia

(74) *Attorney, Agent, or Firm* — Canon USA Inc. IP Division

(57) ABSTRACT

An image forming apparatus includes a web relay unit and, in a case where a file input field exists in screen information acquired from a web service provided by the web server capable of communicating via a network, the web relay unit extracts a file downloaded from another web service which can collaborate with the web service from a storage device, converts the file input field included in the screen information into a selection box, and transmits, to the web browser, screen information in which the extracted file is set to the option of the selection box.

7 Claims, 12 Drawing Sheets

FIG.9

| WEB SERVICE NAME | URL | COLLABORATION-AVAILABLE WEB SERVICE |
|---|---|---|
| CUSTOMER-RELATED INFORMATION MANAGEMENT | http://www.kokyaku.com/download | — |
| FORM GENERATION | http://www.chouhyou.com/seisei | CUSTOMER-RELATED INFORMATION MANAGEMENT |

1001, 1002, 1003

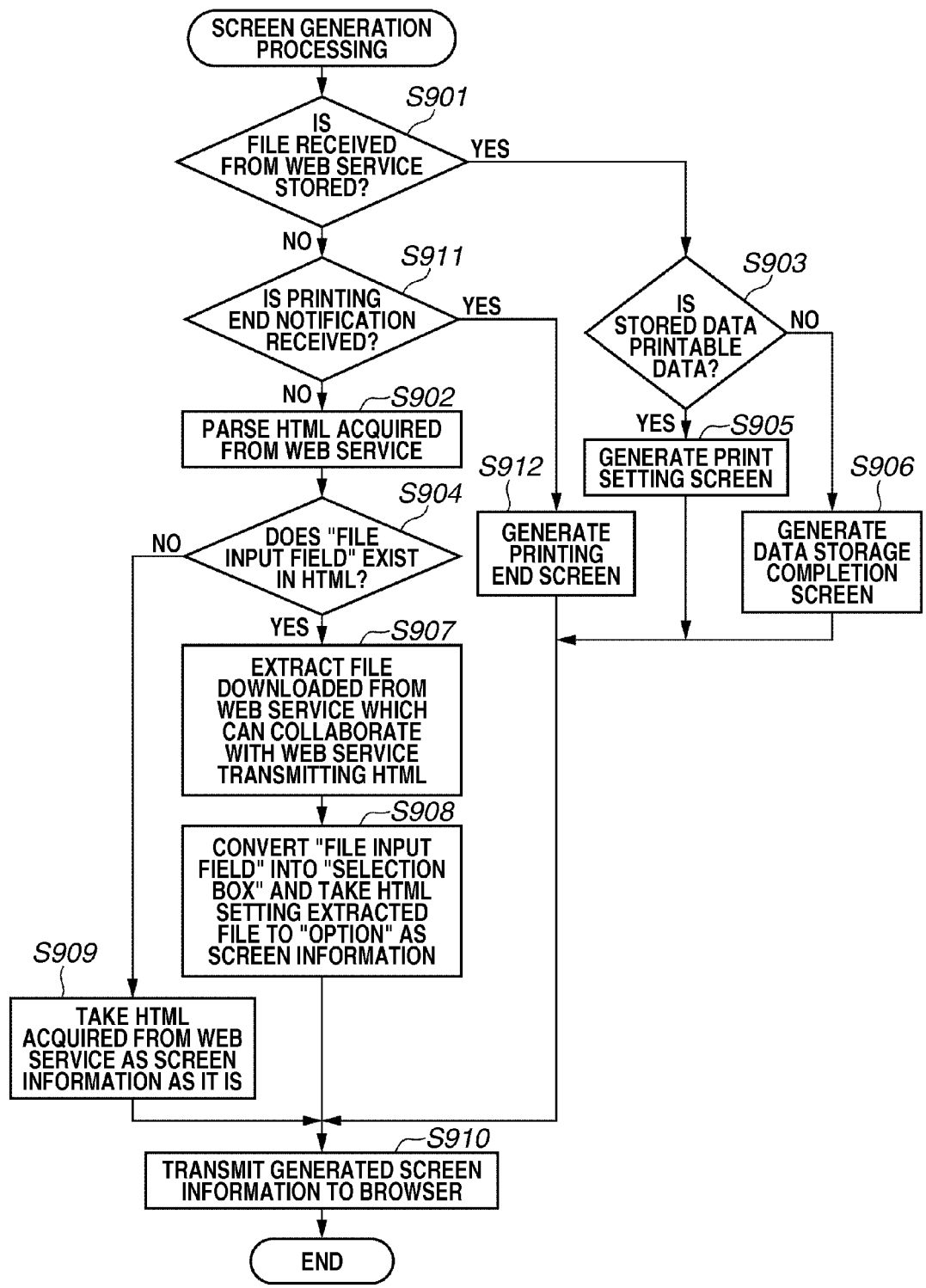

IMAGE FORMING APPARATUS, INFORMATION PROCESSING METHOD, AND STORAGE MEDIUM FOR GENERATING SCREEN INFORMATION

BACKGROUND OF THE INVENTION

1. Field of the Invention

The present invention relates to an image forming apparatus, an information processing method, and a storage medium.

2. Description of the Related Art

Until now, it has been known that an image processing apparatus is connected to an external server on a network to use a service provided by the external server.

According to the description of Japanese Patent Application Laid-Open No. 2007-128370, for example, it has been known that image data generated by reading an image on a document is transmitted to a document management server on a network and registered in a document management database on the document management server side.

It has also been known that, when the image processing apparatus uses the external service, an external server has a web server function and the image processing apparatus uses a web browser to connect with the external server.

In this case, the web browser of the image processing apparatus requests the external server to transmit information about an operation screen and an application of the external server transmits Hyper Text Markup Language (HTML) data for displaying the information about the operation screen in response to the request from the image processing apparatus. The web browser of the image processing apparatus analyzes the received HTML data and displays the information about the operation screen based on the description of the received HTML data.

However, as described above, when the image processing apparatus uses the web browser to connect with the external server and uses the external service provided by the external server, the following problems may be caused.

In a case where a multifunction peripheral (MFP) with a scanner function and a printer function uses the web browser to connect with the external server, for example, operation-screen information provided by the external server may not be normally displayed. This is because the web browser of the MFP does not always conform to all the HTML data provided by the external server.

In general, if the description of "<INPUT type="file">" exists in the HTML data, the web browser operated on a personal computer (PC) displays the input field of a file name and a button "Browse . . . ". When the web browser detects that the button "Browse . . . " is pressed, the web browser displays a file selection dialog. A user may select any file to be transmitted to the external server using the file selection dialog. The web browser of the MFP can display the input field of a file name and the button "Browse . . . ", however, even if the web browser of the MFP detects that the button "Browse . . . " is pressed, the web browser of the MFP does nothing about processing. This is because the web browser of the MFP does not correspond to a function to display a file selection dialog.

The present invention has been made in view of such a problem and has such an object that, in a case where a file input field exists in screen information acquired from a web service provided by the web server, the file input field is converted into a selection box which can be processed by the web browser of the image processing apparatus and a file downloaded from the web service which can collaborate with the web service is set to an option of the selection box.

SUMMARY OF THE INVENTION

According to an aspect of the present invention, an image processing apparatus includes a web browser and a web relay unit configured to relay communication between a web server capable of communicating via a network and the web browser, wherein, in a case where a file input field exists in screen information acquired from a web service provided by the web server capable of communicating via the network, the web relay unit extracts a file downloaded from another web service which can collaborate with the web service from a storage device, converts the file input field included in the screen information into a selection box, and transmits, to the web browser, screen information in which the extracted file is set to an option of the selection box.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is a diagram illustrating an example of a web service management table for managing information about a web service supported by a web application.

FIG. 10 is a flow chart illustrating an example of screen generation processing executed by the web application.

DESCRIPTION OF THE EMBODIMENTS

Various exemplary embodiments, features, and aspects of the invention will be described in detail below with reference to the drawings.

The exemplary embodiment of the present invention is described below with reference to the attached drawings. The exemplary embodiment is described using an example of the processing in which printing is performed with a web server providing a customer-related information management function in corporation with a web server providing a form generation function.

Figure 1:
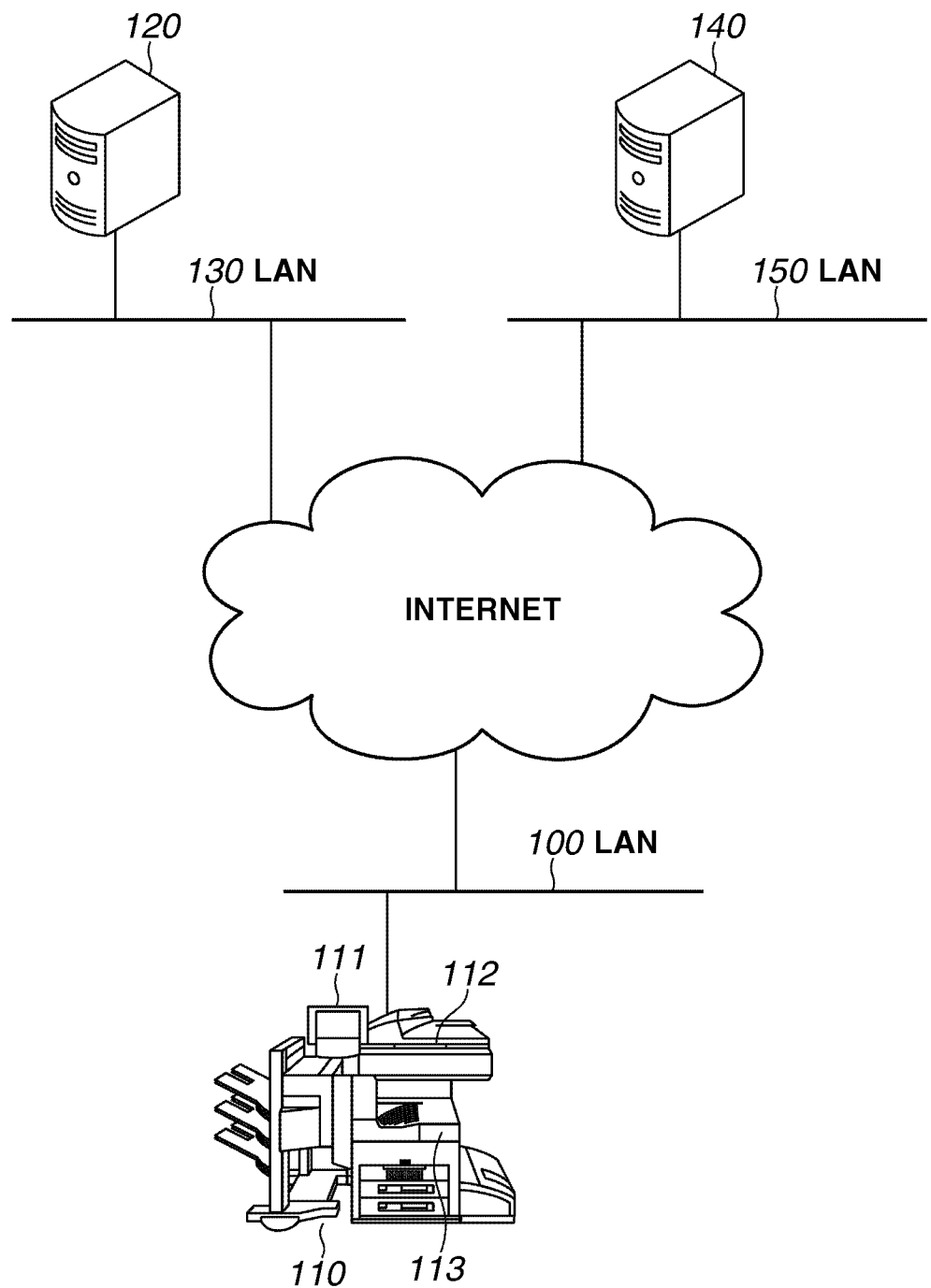
FIG. 1 is a schematic diagram illustrating an example of a configuration of an image forming system according to an exemplary embodiment of the present invention.

FIG. 1 is a schematic diagram illustrating an example of a configuration of an image forming system.

As illustrated in FIG. 1, a multifunction peripheral (MFP) 110, a web server 120, and a web server 140 are connected to communicate with one another via the Internet through local area networks (LANs) 100, 130, and 150 connected thereto respectively.

The MFP 110 has a copy function. The MFP 110 also has a data transmission function to read a document image and transmit the read image data (also referred to as document data) to an apparatus designated on the LAN 100 using a file transfer protocol (FTP) or a server message block (SMB) protocol. The MFP 110 is also capable of creating an e-mail with an image as an attachment file and transmitting the e-mail using an e-mail server (not illustrated). The MFP 110 is an example of the image forming apparatus.

The web server 120 provides the customer-related information management function as a web service. The web server 120 has a database function to manage the customer-related information. The web server 120 has also an operation screen generation function to operate the database function. The web server 120 can transmit database information in response to a request received from the outside via the operation screen.

The web server 140 provides the form generation function as a web service. The web server 140 has the form generation function. The web server 140 has also an operation screen generation function to operate the form generation function. The web server 140 creates a file in a portable document format (PDF) by superposing data on a template, which is a form base, in response to a request received from the outside via the operation screen. The web server 140 can transmit the created file as a response.

The system in the present exemplary embodiment is not limited to the number of the above components.

Figure 2:
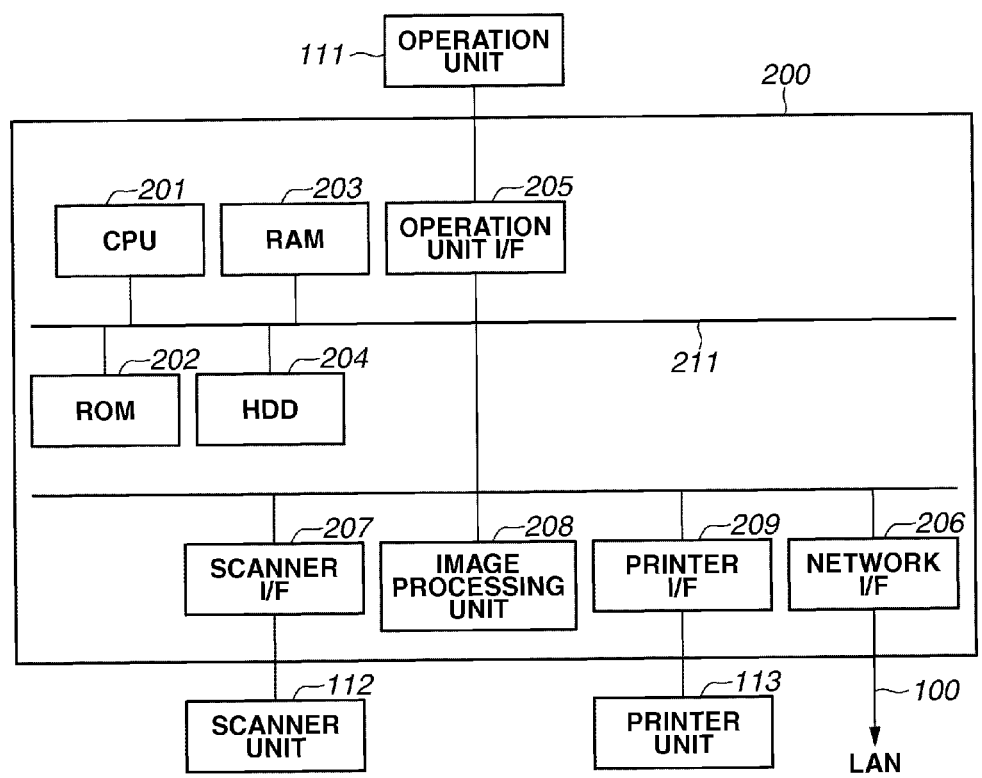
FIG. 2 is a block diagram illustrating an example of a hardware configuration of a multifunction peripheral (MFP).

FIG. 2 is a block diagram illustrating an example of a hardware configuration of the MFP 110.

As illustrated in FIG. 2, the MFP 110 includes a scanner unit 112, a printer unit 113, a controller 200, and an operation unit 111.

The scanner unit 112 converts image information into an electric signal by inputting reflected light obtained by exposure-scanning an image on a document into a charge coupled device (CCD) sensor. The scanner unit 112 converts the electric signal into a luminance signal including red (R), green (G), and blue (B) colors and outputs the luminance signal as digital image data to the controller 200. The document is loaded to a document feeder. When a user instructs the controller 200 to start reading via the operation unit 111, the controller 200 instructs the scanner unit 112 to read the document. The scanner unit 112 receives the instructions, feeds the document one by one from the document feeder, and reads the document. The document may be read such that the document is placed on a glass plate (not illustrated) and an exposure unit is moved to scan the document, instead of an automatic feeding system using the document feeder.

The printer unit 113 is an image forming MFP for forming the image data received from the controller 200 as an image on a sheet of paper. In the present exemplary embodiment, the image forming method is meant to be an electrophotographic method using a photosensitive drum and a photosensitive belt, but not limited this.

The controller 200 is electrically connected not only to the operation unit 111, the scanner unit 112, and the printer unit 113, but also to a LAN 100 via a network I/F 206. In other words, the controller 200 is connected to other devices via the LAN 100. This enables communication by the HyperText Transfer Protocol (HTTP).

A central processing unit (CPU) 201 totally controls access to various MFPs which are being connected thereto and access from other MFPs based on control programs stored in a read only memory (ROM) 202. The CPU 201 also totally controls various processing performed inside the controller 200. The control includes the execution of a program for realizing the flow chart described later. The CPU 201 is an example of a computer of the image forming apparatus.

The ROM 202 stores a boot program of the apparatus. A random access memory (RAM) 203 is a system work memory for operating the CPU 201 and a memory for temporarily storing image data. The RAM 203 is formed of an area for storing contents stored by the backup of a power supply even after the power supply of the apparatus body is turned off and an area where the stored contents are deleted after the power supply is turned off.

A hard disk drive (HDD) 204 can store a system software and image data.

An operation unit interface (I/F) 205 is an interface unit for connecting a system bus 211 to the operation unit 111. The operation unit I/F 205 receives image data displayed on the operation unit 111 from the system bus 211, and outputs the image data to the operation unit 111 and information input from the operation unit 111 to the system bus 211 as well.

The network I/F 206 is connected to the LAN 100 and the system bus 211 to input and output information.

A scanner I/F 207 performs correction, processing, and editing on the image data received from the scanner unit 112. The scanner I/F 207 has a function to determine whether the received image data is either a color document or a monochrome document, and either a text document or a photographic document.

An image processing unit 208 performs direction conversion, image compression, and decompression processing on the image data. The image processing unit 208 can synthesize the images stored in the HDD 204 into one image.

A printer I/F 209 receives the image data sent from the image processing unit 208 and provides the image data with image formation while referring to attribute data attached to the image data. The image data after the image formation is output to the printer unit 113.

Figure 3:
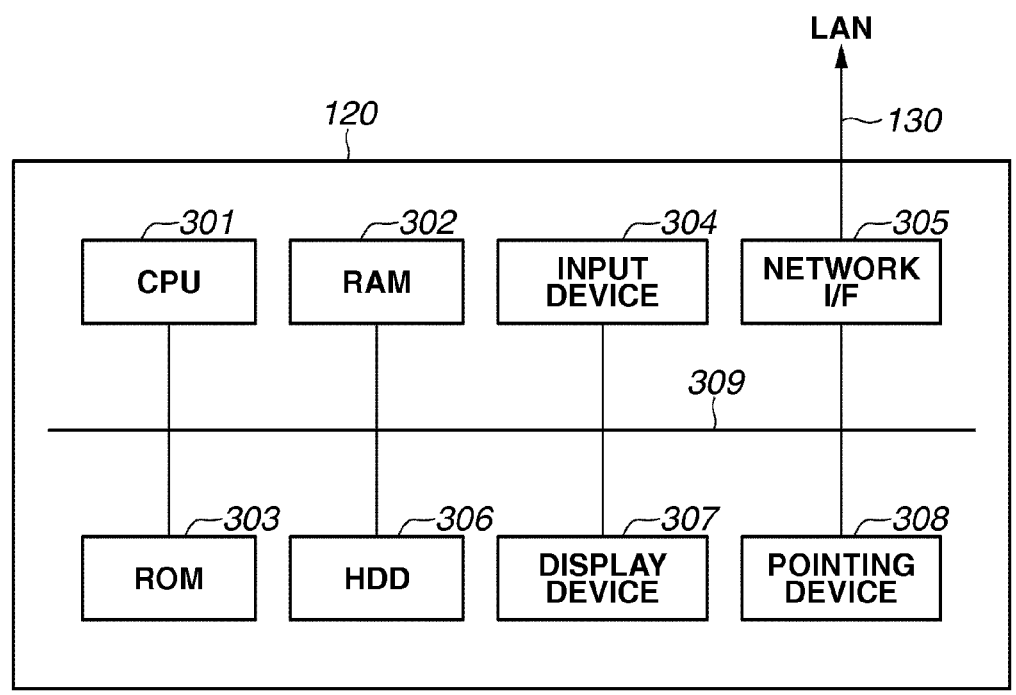
FIG. 3 is a block diagram illustrating an example of a hardware configuration of a web server.

FIG. 3 is a block diagram illustrating an example of hardware configuration of the web server 120.

A CPU 301, a RAM 302, a ROM 303, a network I/F 305, and a hard disk drive (HDD) 306 are connected to communicate with one another via a system bus 309. Furthermore, a display device 307, such as a cathode-ray tube (CRT), an input device 304, such as a keyboard, and a pointing device 308, such as a mouse, are connected to communicate with one another via the system bus 309.

The ROM 303 or the HDD 306 stores control programs such as an operating system and a web application.

The CPU 301 reads the control programs from the ROM 303 or the HDD 306 onto the RAM 302 as needed and executes the control programs to function as a computer. The CPU 301 displays various information via the display device 307 and receives user instructions from the input device 304 or the pointing device 308. Furthermore, the CPU 301 is connected to the LAN 130 via the network I/F 305 and communicates with other devices.

Figure 4:
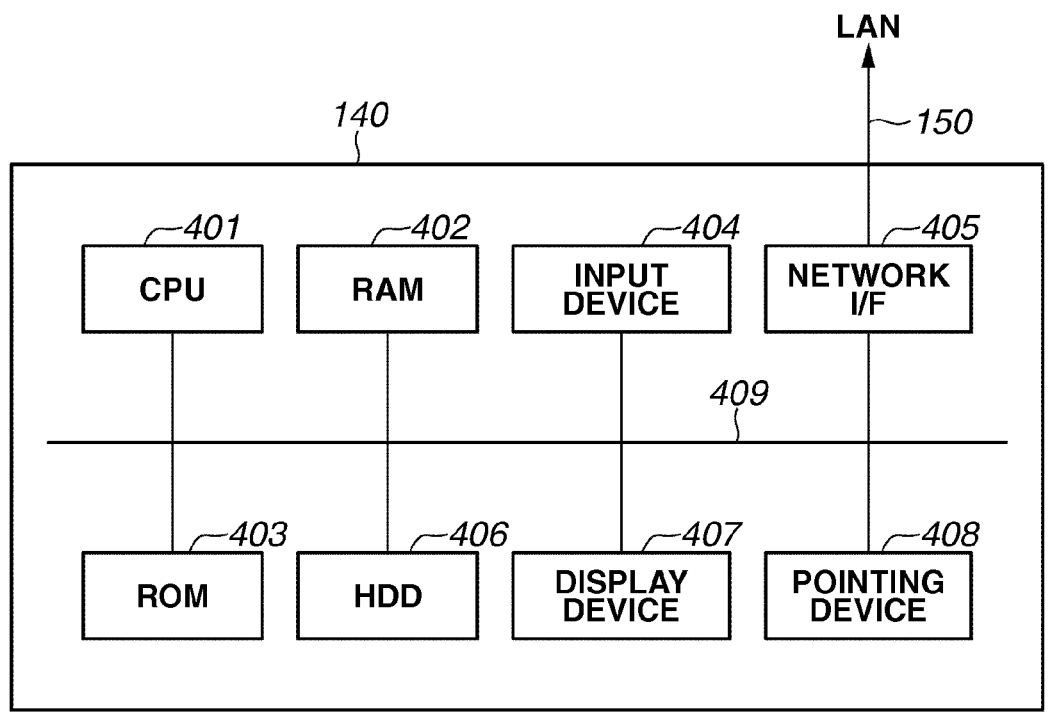
FIG. 4 is a block diagram illustrating an example of a hardware configuration of a web server.

FIG. 4 is a block diagram illustrating an example of a hardware configuration of the web server 140.

A CPU 401, a RAM 402, a ROM 403, a network I/F 405, and an HDD 406 are connected to communicate with one another via a system bus 409. Furthermore, a display device 407 such as a CRT, an input device 404 such as a keyboard, and a pointing device 408 such as a mouse are connected to communicate with one another via the system bus 409.

The ROM 403 or the HDD 406 stores control programs such as an operating system and a web application.

The CPU 401 reads the control programs from the ROM 403 or the HDD 406 onto the RAM 402 as needed and executes the control programs to function as a computer. The CPU 401 displays various information via the display device 407 and receives user instructions from the input device 404 or the pointing device 408. Furthermore, the CPU 401 is connected to the LAN 150 via the network I/F 405 and communicates with other devices.

Figure 5:
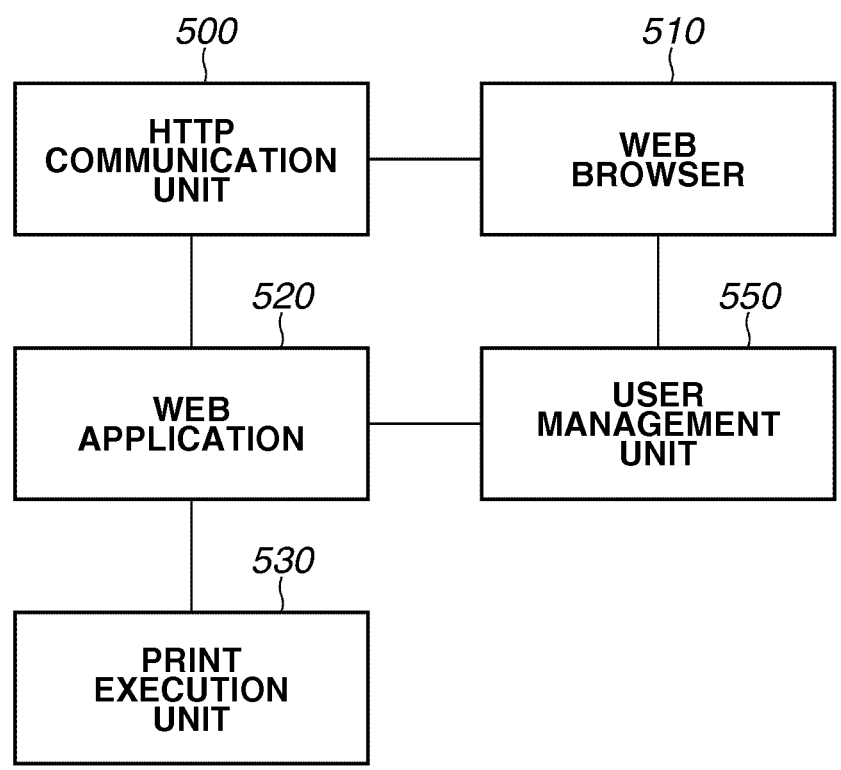
FIG. 5 is a block diagram illustrating an example of a software configuration of the MFP.

FIG. 5 is a block diagram illustrating an example of a software configuration of the MFP 110.

The software module illustrated in FIG. 5 is realized by the CPU 201 executing the programs stored in the HDD 204 of the MFP 110.

An HTTP communication unit 500 is a software module for performing communication using the HTTP by operating the network I/F 206.

A web browser 510 is a web browser for communicating with a web application 520 via the HTTP communication unit 500. The web browser 510 requests the web application 520 to send an operation screen described by an HTML. The web browser 510 renders the HTML data of the operation screen received from the web application 520 via the HTTP communication unit 500 and displays the rendered data on the operation unit 111. The web browser 510 notifies the web application 520 of the input to the operation screen displayed on the operation unit 111.

The web application 520 provides the web browser 510 with the operation screen and communicates with the web server 120 and the web server 140 via the HTTP communication unit 500 according to the input to the operation screen of which the web browser 510 notifies. If the HTML data provided by the web server includes information which cannot be normally processed by the web browser 510, the web application 520 converts the information into the HTML data which can be normally processed by the web browser 510. The web application 520 is a software module for transmitting the converted HTML data to the web browser 510. The web application 520 is an example of a web relay unit for relaying communication between the web server capable of communicating via the network and the web browser 510.

A print execution unit 530 is a software module for executing print processing according to print instructions from the web application 520.

A user management unit 550 is a software module for authenticating a user and identifying a user operating the MFP 110.

Figure 6:
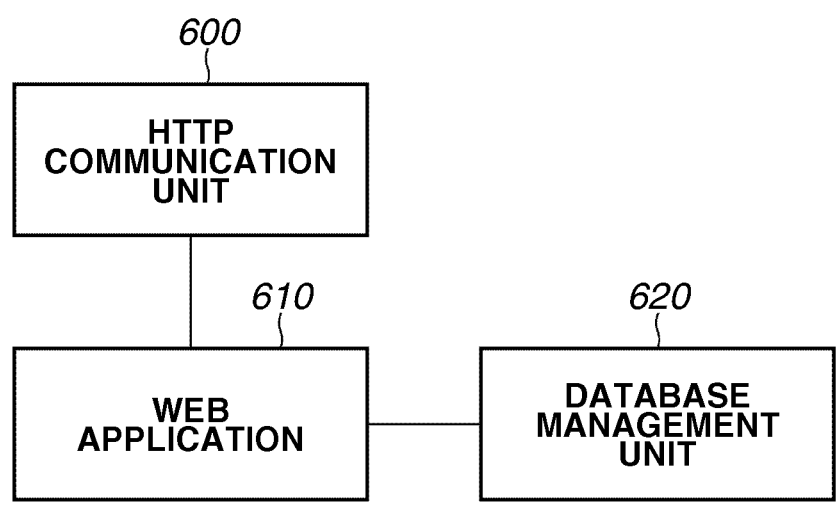
FIG. 6 is a block diagram illustrating an example of a software configuration of the web server with a function to manage customer-related information to be printed.

FIG. 6 is a block diagram illustrating an example of a software configuration of the web server 120 with a function to manage customer-related information to be printed.

The software module illustrated in FIG. 6 is realized by the CPU 301 executing the programs stored in the HDD 306 of the web server 120.

An HTTP communication unit 600 is a software module for performing communication using the HTTP by operating the network I/F 305.

A web application 610 is a software module for providing a customer-related information management web service.

The web application 610 transmits the operation screen to the MFP 110 in response to the request from the MFP 110 via the HTTP communication unit 600. The web application 610 receives input information from the user input via the operation screen displayed by the MFP 110 via the HTTP communication unit 600 and instructs a database management unit 620 to process the information.

The database management unit 620 is a software module for storing and extracting data according to the instructions of the web application 610.

Figure 7:
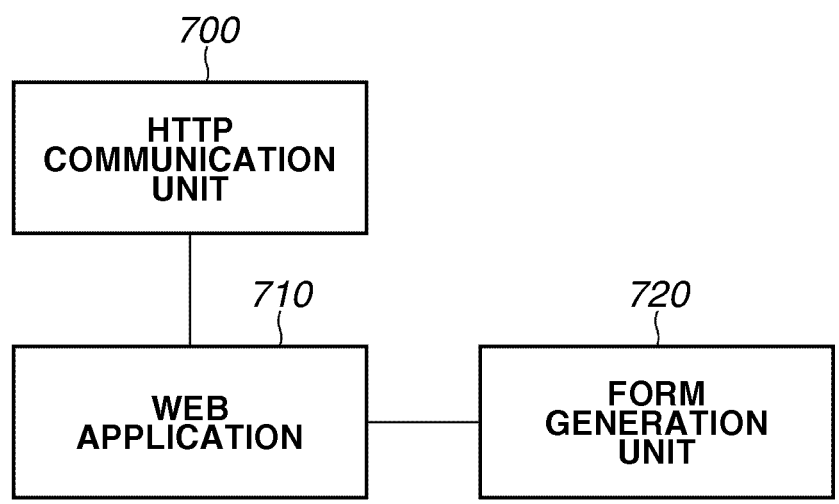
FIG. 7 is a block diagram illustrating an example of a software configuration of the web server with a function to generate form data which can be printed by the MFP.

FIG. 7 is a block diagram illustrating an example of a software configuration of the web server 140 with a function to generate form data which can be printed by the MFP 110.

The software module illustrated in FIG. 7 is realized by the CPU 401 executing the programs stored in the HDD 406 of the web server 140.

An HTTP communication unit 700 is a software module for performing communication using the HTTP by operating the network I/F 405.

A web application 710 is a software module for providing a form generation web service. The web application 710 transmits the operation screen to the MFP 110 in response to the request from the MFP 110 via the HTTP communication unit 700. The web application 710 receives input information from the user input via the operation screen displayed by the MFP 110 via the HTTP communication unit 700 and instructs a form generation unit 720 to process the information.

The form generation unit 720 is a software module for superimposing the data received from the web application 710 on a form template to generate a form according to the instructions of the web application 710.

Figure 8:
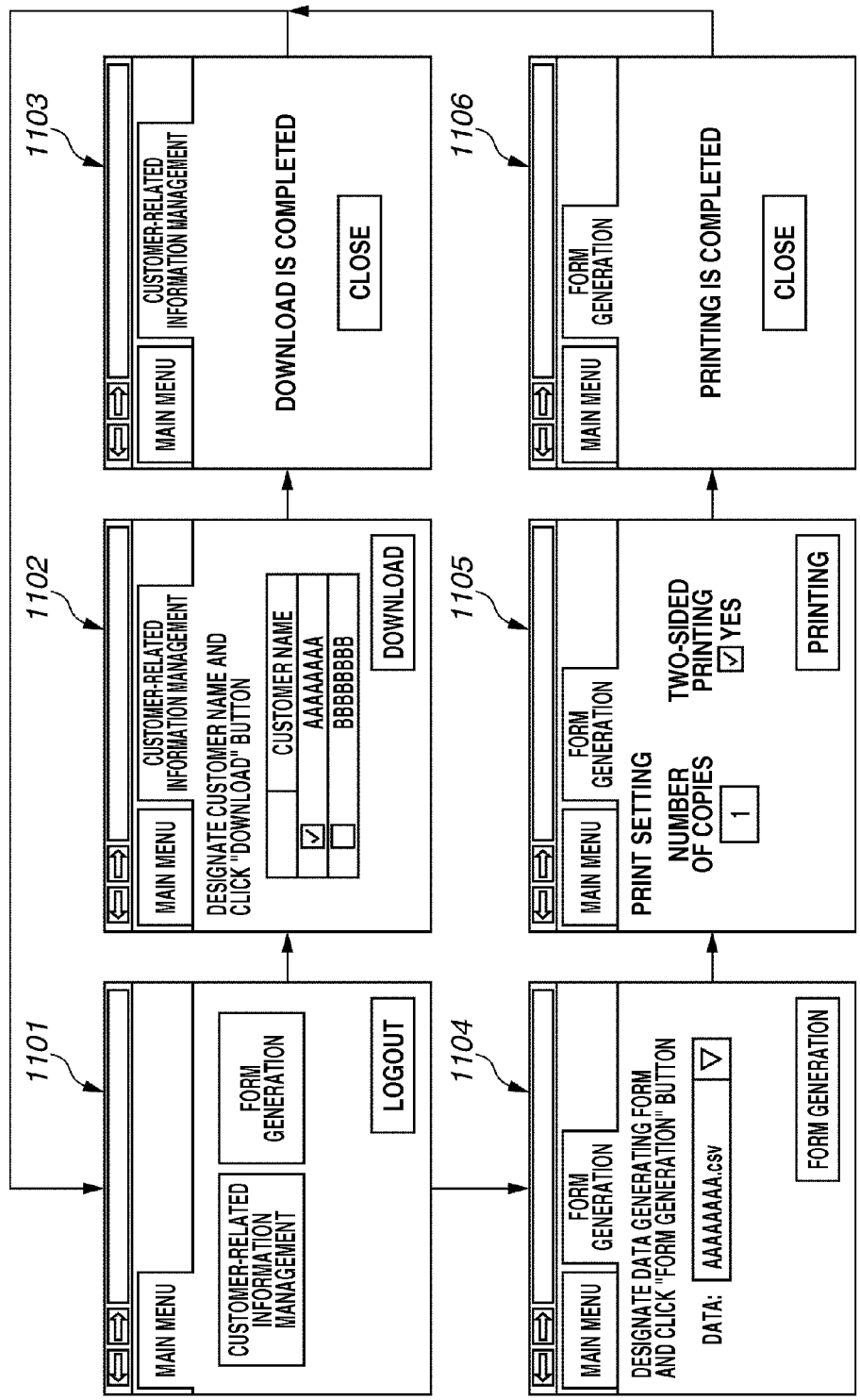
FIG. 8 is a schematic diagram illustrating an example of the transition of screens in the present exemplary embodiment using a web browser of the MFP.

FIG. 8 is a schematic diagram illustrating an example of the transition of screens in the present exemplary embodiment using the web browser of the MFP.

All the operation screens illustrated in FIG. 8 are those displayed on the operation unit 111 of the MFP 110.

An initial screen 1101 is the one for displaying the web service supported by the web application 520. The initial screen 1101 includes a customer-related information management button, a form generation button, and a logout button.

A customer-related information download screen 1102 is an operation screen for downloading customer information from the web server 120 providing customer-related information management service. The customer-related information download screen 1102 includes a customer name, check boxes for selecting a customer name, and a download button.

A download completion screen 1103 is a screen displayed when the web application 520 stores a file downloaded from the web server in the temporary storage area. The download completion screen 1103 includes a close button.

A form generation information selection screen 1104 is a screen for performing transmission to the web server 140 providing the form generation service and selecting form generation information. The form generation information selection screen 1104 includes a selection box for selecting the form generation information and the form generation button for transmitting the selected customer information to the web server 140 providing the form generation service to cause the web server 140 to generate printable form data.

A print setting screen 1105 is a screen displayed when the web application 520 stores the printable file downloaded from the web server in the temporary storage area. The print setting screen 1105 includes the number of copies, two-sided printing setting, and a printing button. The number of sheets of paper to be printed is input to the number of copies. The two-sided printing setting is a check box for setting whether two-sided printing is to be performed. The printing button is a button for starting printing the downloaded file according to the designated print setting.

FIG. 9 is a diagram illustrating an example of a web service management table for managing information about the web service supported by the web application 520.

The web service management table is composed of information of a web service name 1001, a uniform resource locator (URL) 1002, and a collaboration-available web service 1003.

The web service name 1001 is used as a button name of the initial screen 1101. The URL 1002 is used as an address of the web server connected when the press of the button is detected.

The collaboration-available web service 1003 is used for extracting the file downloaded from the collaboration-available web service.

The web service management table is stored in the HDD 204 being an example of the storage device. The MFP 110 may store information in the web service management table or change the information based on the user operation via the operation unit 111.

FIG. 10 is a flow chart illustrating an example of the screen generation processing executed by the web application 520.

The screen generation processing is executed when data is received from the web service of a connection destination.

In step S901, the web application 520 determines whether the file received from the web service is stored in the temporary storage area immediately before the screen generation processing. If the file is stored (YES in step S901), the web application 520 proceeds to step S903. If the file is not stored (NO in step S901), the web application 520 proceeds to step S911.

In step S911, the web application 520 determines whether a printing end notification is received. If the printing end notification is received (YES in step S911), the web application 520 proceeds to step S912. If the printing end notification is not received (NO in step S911), the web application 520 proceeds to step S902.

In step S912, the web application 520 stores a printing end screen as screen information.

In step S902, the web application 520 parses the HTML data received from the web service of the connection destination to extract an element forming the screen.

In step S904, the web application 520 determines whether a file name input field (<INPUT type="file">) exists in the element forming the screen extracted in step S902. If the file name input field exists therein (YES in step S904), the web application 520 proceeds to step S907. If the file name input field does not exist therein (NO in step S904), the web application 520 proceeds to step S909.

In step S907, the web application 520 refers to the collaboration-available web service 1003 to extract the file downloaded from the web service which can collaborate with the web service of the connection destination from the storage device such as the RAM 203 or the HDD 204.

In step S908, the web application 520 replaces the filename input field (<INPUT type="file">) with the selection box (<select name="file">). The web application 520 sets the file extracted in step S907 as an option element (<option value="AAAAAAAA.csv"> AAAAAAAA.csv </option>) and stores the option element as screen information.

In step S909, the web application 520 stores HTML data received from the web service of the connection destination as screen information as it is.

In step S903, the web application 520 determines whether the stored file is a printable file. If the stored file is a printable file (YES in step S903), the web application 520 proceeds to step S905. If the stored file is not a printable file (NO in step S903), the web application 520 proceeds to step S906.

In step S905, the web application 520 stores a print setting screen as screen information.

In step S906, the web application 520 stores a download completion screen as screen information.

In step S910, the web application 520 transmits the stored screen information to the web browser and ends screen generation processing.

Figure 11A:
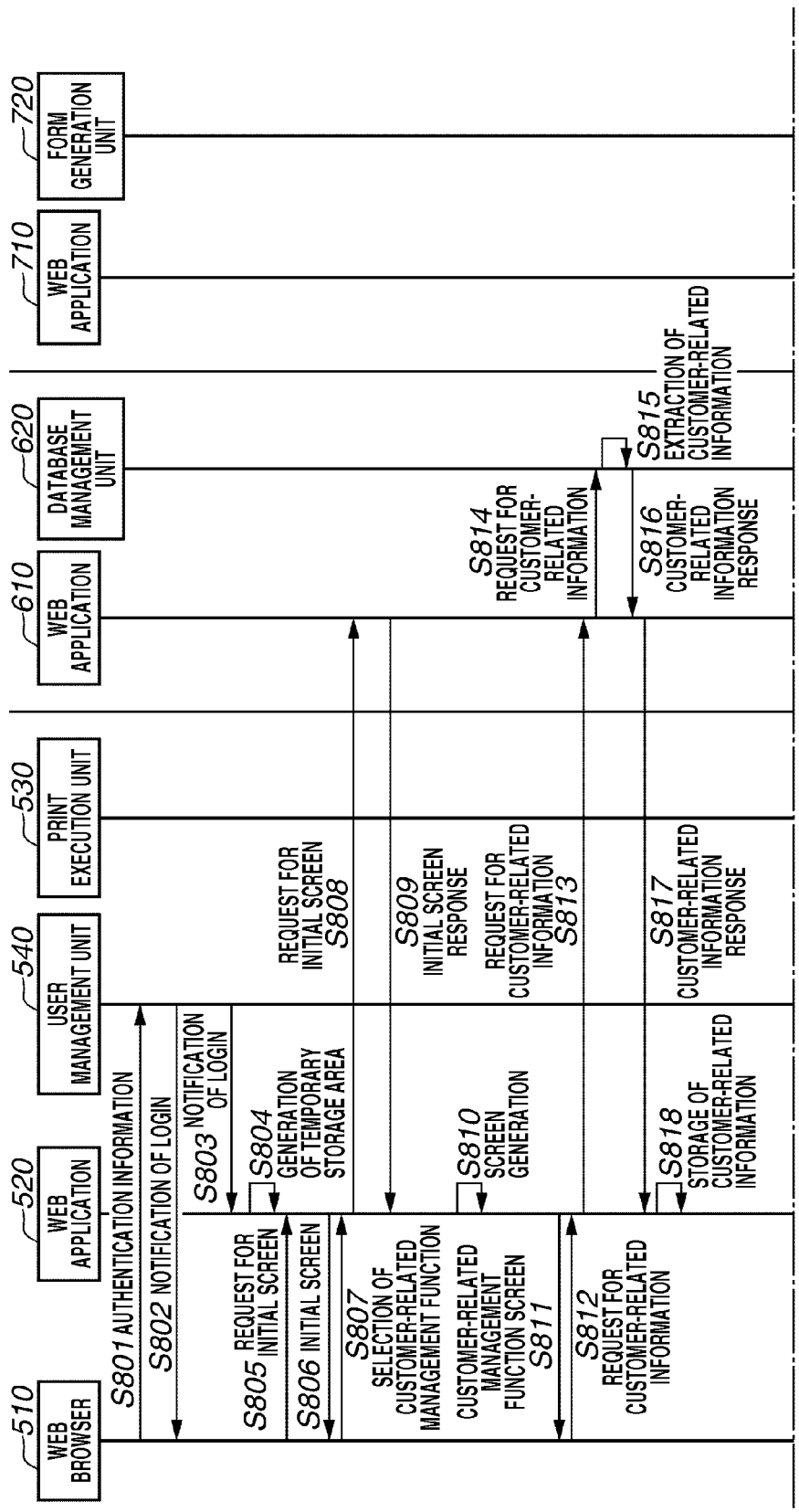
FIGS. 11A and 11B are diagrams illustrating an example of sequence for information processing of the image forming system.
Figure 11B:
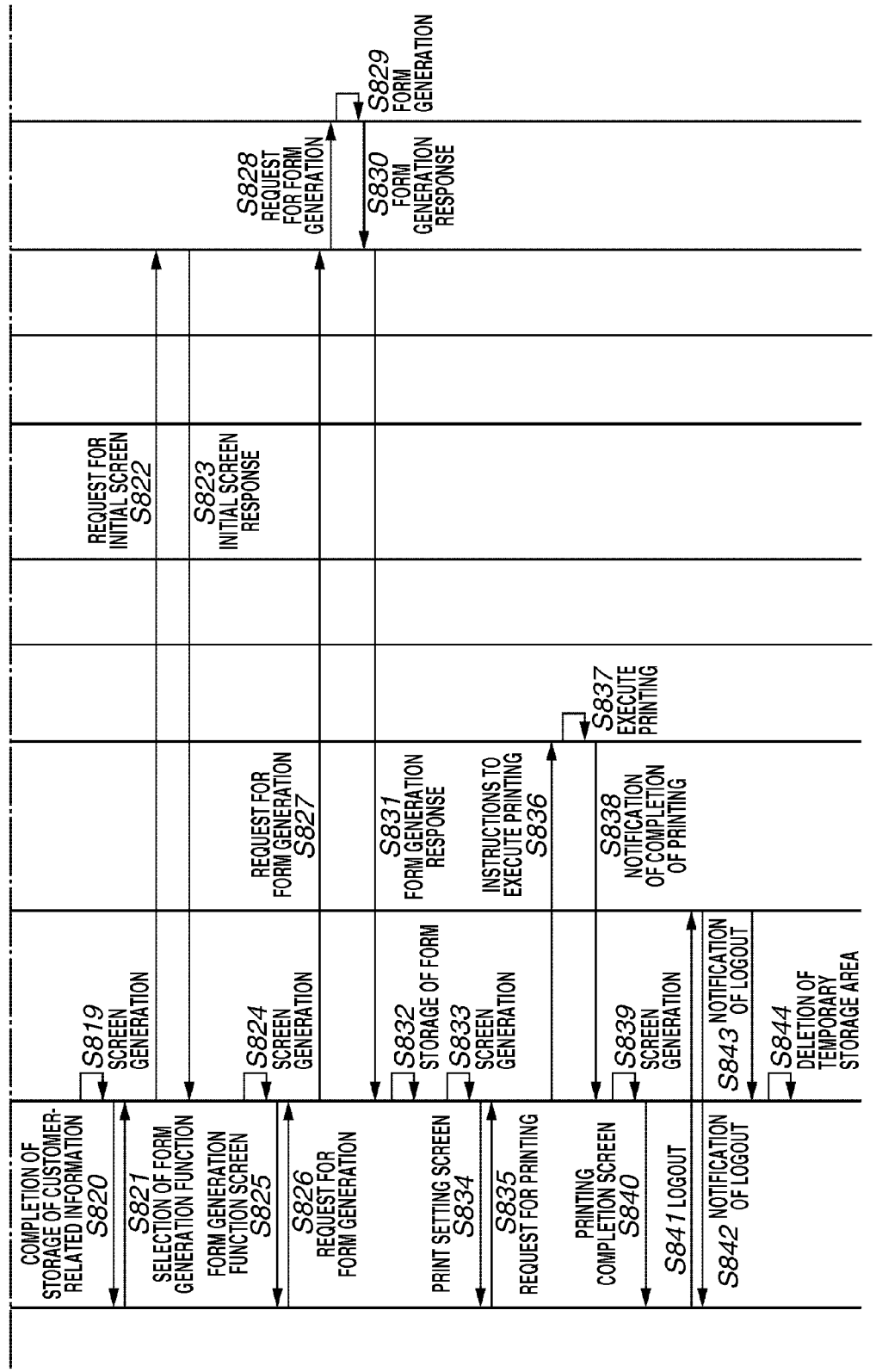

FIGS. 11A and 11B are diagrams illustrating an example of a sequence for information processing of the image forming system.

In step S801, the web browser 510 transmits authentication information input by the user on an authentication information input screen (not illustrated) to a user management unit 540.

In step S802, the user management unit 540 authenticates a user to transmit login notification to the web browser 510.

In step S803, the user management unit 540 transmits the login notification to the web application 520.

In step S804, the web application 520 creates a temporary storage area for a login user in the HDD 204.

In step S805, the web browser 510 transmits a request message including a request for an initial screen to the web application 520.

In step S806, the web application 520 transmits HTML data of the initial screen 1101 to the web browser 510 as a response message for the request message received in step S805.

In step S807, the web browser 510 detects that the user presses a customer-related information management button, and transmits a request message notifying the web application 520 thereof.

In step S808, the web application 520 refers to information of the URL 1002 to transmit a request message requesting the web application 610 to send a screen.

In step S809, the web application 610 transmits the HTML data of screen information as a response message to the web application 520.

In step S810, the web application 520 performs screen generation processing consisting of steps S901, S911, S902, S904, S909, and S910.

In step S811, the web application 520 transmits the HTML data of the customer-related information download screen 1102 created in step S810 as a response message for the request message received in step S807.

In step S812, the web browser 510 detects that the user checks the check box for selecting a customer name and presses the download button, and transmits a request message notifying the web application 520 thereof. At this point, it is considered that the user checked the check box of a customer AAAAAAAA.

In step S813, the web application 520 transmits a request message including a request for the data of the customer AAAAAAAA to the web application 610.

In step S814, the web application 610 receiving the request message from the web application 520 requests the database management unit 620 to extract information about the customer AAAAAAAA.

In step S815, the database management unit 620 receiving the request from the web application 610 extracts information about the customer AAAAAAAA (customer-related information) from a database managing the information about the customer AAAAAAAA.

In step S816, the database management unit 620 transmits the data of the customer AAAAAAAA (the file in which the customer-related information is described) extracted in step S815 to the web application 610 as a response to the request received from the web application 610 in step S814.

In step S817, the web application 610 transmits, to the web application 520, the data of the customer AAAAAAAA as a response message to the request message received in step S814. The file format of data of the customer AAAAAAAA is taken as a comma separated values (CSV) format.

In step S818, the web application 520 receiving the data of the customer AAAAAAAA as the response message from the web application 610 stores the data of the customer AAAAAAAA in the temporary storage area created in step S804.

In step S819, the web application 520 performs screen generation processing consisting of steps S901, S903, S906, and S910.

In step S820, the web application 520 transmits, to the web browser 510, the HTML data of the download completion screen 1103 created in step S819 as a response message to the request message received in step S812.

In step S821, when the web browser 510 detects that the user presses the close button included in the download completion screen 1103, the web browser 510 closes the download completion screen 1103 to cause the initial screen 1101 to be displayed. When the web browser 510 detects that the user presses the form generation button, the web browser 510 transmits a request message notifying the web application 520 thereof.

In step S822, the web application 520 refers to the information of the URL 1002 to transmit a request message including a request for a screen to the web application 710.

In step S823, the web application 710 transmits the HTML data of screen information as a response message to the web application 520.

In step S824, the web application 520 performs screen generation processing consisting of steps S901, S911, S902, S904, S907, S908, and S910.

In step S825, the web application 520 transmits the HTML data of the form generation information selection screen 1104 created in step S824 as a response message to the request message received in step S821.

In step S826, when the web browser 510 detects that the user selects form generation information and presses the form generation button, the web browser 510 transmits a request message notifying thereof to the web application 520. At this point, it is considered that the customer information AAAAAAAA.csv is selected as form generation information by the user.

In step S827, the web application 520 transmits (uploads) a request message including a request for generating a form by the data of the customer AAAAAAAA to the web application 710.

In step S828, the web application 710 receiving the request message from the web application 520 requests the form generation unit 720 to generate a form by the data of the customer AAAAAAAA.

In step S829, the form generation unit 720 receiving the request from the web application 710 generates form data by overlying the information of the customer AAAAAAAA and the template. The generated form uses a file format of a portable document format (PDF).

In step S830, the form generation unit 720 transmits the form data of the customer AAAAAAAA generated in step S829 to the web application 710 as a response to the request received from the web application 710 in step S828.

In step S831, the web application 710 transmits, to the web application 520, the form data of the customer AAAAAAAA as a response message to the request message received in step S827.

In step S832, the web application 520 stores the form data of the customer AAAAAAAA in the temporary storage area created in step S804.

In step S833, the web application 520 performs screen generation processing consisting of steps S901, S903, S905, and S910.

In step S834, the web application 520 transmits, to the web browser, the HTML data of the print setting screen 1105 generated in step S833 as a response message to the request message received in step S826.

In step S835, when the web browser 510 detects that the user performs print setting and presses the printing button, the web browser 510 transmits a request message notifying thereof to the web application 520.

In step S836, the web application 520 delivers the print setting information received from the web browser 510 and the form data of the customer AAAAAAAA to the print execution unit 530 to request the print execution unit 530 to perform printing.

In step S837, the print execution unit 530 executes the printing of the form data of the customer AAAAAAAA received from the web application 520 in step S836 at the print setting received therein at the same time.

In step S838, the print execution unit 530 notifies the web application 520 that the printing is ended as a response to the request received in step S836.

In step S839, the web application 520 performs screen generation processing consisting of steps S901, S911, S912, and S910.

In step S840, the web application 520 transmits, to the web browser 510, the HTML data of a printing end screen 1106 generated in step S839 as a response message to the request message received in step S835.

In step S841, when the web browser 510 detects that the user presses a logout button, the web browser 510 transmits a request message notifying thereof to the user management unit 540.

In step S842, the user management unit 540 performs logout processing and notifies the web browser 510 of the logout.

In step S843, the user management unit 540 transmits a logout notification to the web application 520.

In step S844, the web application 520 deletes the temporary storage area for the login user from the HDD 204.

The present invention can also be realized by executing the following processing. More specifically, the processing is executed such that a software (program) realizing the functions of the above exemplary embodiment is supplied to a system or a device via a network or various storage media and a computer (or a CPU, a micro processing unit (MPU), and/or the like) for the system or the device reads and executes the program.

According to each exemplary embodiment described above, in a case where a file input field exists in screen information acquired from the web service provided by the web server, the file input field is converted into a selection box which can be processed by the web browser of the image processing apparatus and a file downloaded from the web service which can collaborate with the web service can be set to the option of the selection box.

Thereby, web services can be caused to collaborate with one another. More specifically, the MFP acquires data stored in the external server (the web server) and sends the acquired data to another external server. There can be realized print processing performed with a plurality of external servers caused to collaborate with one another, in which the MFP acquires printable data generated by the external server receiving data to perform printing. In other words, there can be provided a mechanism in which printing is performed such that the web browser of the MFP is used to cause the services provided by a plurality of the external servers to collaborate with one another.

Accordingly, each of the above exemplary embodiments can provide a mechanism for generating screen information for properly displaying an operation screen on the web browser, cause the external servers to collaborate with one another and perform printing based on service information transmitted from the external server.

According to the present invention, in a case where a file input field exists in screen information acquired from the web service provided by the web server, the file input field is converted into a selection box which can be processed by the web browser of the image processing apparatus and a file downloaded from the web service which can collaborate with the web service can be set to the option of the selection box. Thereby, the web service can be caused to collaborate with one another.

Aspects of the present invention can also be realized by a computer of a system or apparatus (or devices such as a CPU, an MPU, and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-177921 filed Aug. 6, 2010, which is hereby incorporated by reference herein in its entirety.

What is claimed is:

1. An image forming apparatus comprising: a web browser; and a web relay unit configured to relay communication between a web server capable of communicating via a network and the web browser; wherein, in a case where a file input field exists in screen information acquired from a web application provided by the web server capable of communicating via the network, the web relay unit extracts a file downloaded from another web application which can collaborate with the web application from a storage device, converts the file input field included in the screen information into a selection box, and transmits, to the web browser, screen information in which the extracted file is set to an option of the selection box, wherein the web application from which the screen information is acquired is configured to provide a function to generate form data which can be printed by the image forming apparatus, and wherein the web relay unit uploads the selected file to the application from which the screen information is acquired to request the web application to generate form data based on the file.

2. The image forming apparatus according to claim 1, wherein the web relay unit identifies a web application which can collaborate with the web application from which the screen information is acquired, based on data, stored in the storage device, of web applications which can collaborate with each other and extracts the file downloaded from the identified web application.

3. The image forming apparatus according to claim 1, wherein the web relay unit downloads a file from the web application provided by the web server capable of communicating via the network based on instructions from the web browser and stores the file in the storage device.

4. The image forming apparatus according to claim 3, wherein the web application is configured to provide a function to manage customer-related information to be printed, and wherein the web relay unit downloads the file in which the customer-related information is described from the web application.

5. The image forming apparatus according to claim 1, wherein the web relay unit uploads the selected file among the files set to the selection box to the web application from which the screen information is acquired, based on instructions from the web browser via the screen generated based on the screen information.

6. An information processing method in an image forming apparatus including a web browser and a web relay unit configured to relay communication between a web server capable of communicating via a network and the web browser, the method comprising, via the web relay unit: in a case where a file input field exists in screen information acquired from a web application provided by the web server capable of communicating via the network, extracting a file downloaded from another web application which can collaborate with the web application from a storage device; converting the file input field included in the screen information into a selection box; setting the extracted file to an option of the converted selection box; and transmitting the screen information, in which the file is set to the option of the selection box, to the web browser, wherein the web application from which the screen information is acquired is configured to provide a function to generate form data which can be printed by the image forming apparatus, and wherein the web relay unit uploads the selected file to the application from which the screen information is acquired to request the web application to generate form data based on the file.

7. A storage medium storing a program for causing a computer of an image forming apparatus including a web browser to function as a web relay unit configured to relay communication between a web server capable of communicating via a network and the web browser, wherein, in a case where a file input field exists in screen information acquired from a web application provided by the web server capable of communicating via the network, the web relay unit extracts a file downloaded from another web application which can collaborate with the web application from a storage device, converts the file input field included in the screen information into a selection box, and transmits, to the web browser, screen information in which the extracted file is set to the option of the selection box, wherein the web application from which the screen information is acquired is configured to provide a function to generate form data which can be printed by the image forming apparatus, and wherein the web relay unit uploads the selected file to the application from which the screen information is acquired to request the web application to generate form data based on the file.

* * * * *